(12) United States Patent
Sano (10) Patent No.: US 8,316,514 B2
(45) Date of Patent: Nov. 27, 2012

(54) TRIM CLIP FOR TRIM FOR CURTAIN SIDE AIR BAG

(75) Inventor: Takahiro Sano, Toyohashi (JP)

(73) Assignee: Newfry LLC, Newark, DE (US)

( * ) Notice: Subject to any disclaimer, the term of this patent is extended or adjusted under 35 U.S.C. 154(b) by 107 days.

(21) Appl. No.: 12/727,527

(22) Filed: Mar. 19, 2010

(65) Prior Publication Data

US 2010/0199464 A1    Aug. 12, 2010

(30) Foreign Application Priority Data

Sep. 21, 2007  (JP) .................................. 2007-245389
Sep. 18, 2008  (WO) ................ PCT/US2008/076854

(51) Int. Cl.
*F16B 21/08* (2006.01)
*F16B 5/06* (2006.01)

(52) U.S. Cl. ................ 24/297; 24/289; 24/302; 24/458; 24/581.11; 248/74.1; 248/74.3; 411/508

(58) Field of Classification Search ............ 24/289, 24/297, 302, 458, 581.11; 248/74.1, 74.3; 411/508
See application file for complete search history.

(56) References Cited

U.S. PATENT DOCUMENTS

| | | | | |
|---|---|---|---|---|
| 2,937,834 A * | 5/1960 | Orenick et al. | ................. | 248/71 |
| 3,465,992 A * | 9/1969 | Schuplin | ......................... | 248/71 |
| 3,758,060 A * | 9/1973 | Schuplin | .................... | 248/74.3 |
| 4,176,428 A * | 12/1979 | Kimura | .......................... | 24/326 |
| 4,716,633 A * | 1/1988 | Rizo | .............................. | 24/453 |
| 4,952,106 A * | 8/1990 | Kubogochi et al. | ............. | 411/48 |
| 5,163,795 A * | 11/1992 | Benoit et al. | .................... | 411/45 |
| 5,375,954 A * | 12/1994 | Eguchi | ............................ | 411/48 |
| 5,387,065 A | 2/1995 | Sullivan | | |
| 5,599,148 A * | 2/1997 | Hirose | ......................... | 411/175 |
| 5,850,676 A * | 12/1998 | Takahashi et al. | ............. | 24/297 |
| 6,287,064 B1 * | 9/2001 | Jhumra et al. | ................ | 411/175 |
| 6,394,695 B1 | 5/2002 | Chausset | | |
| 6,431,585 B1 * | 8/2002 | Rickabus et al. | .......... | 280/728.3 |
| 2004/0020016 A1 * | 2/2004 | Yoneoka | ........................ | 24/297 |

* cited by examiner

*Primary Examiner* — Robert J Sandy
*Assistant Examiner* — David Upchurch
(74) *Attorney, Agent, or Firm* — Michael P. Leary (57) ABSTRACT

A trim clip includes a tether, a main clip body, and a pin. In the assembled condition, a body securing part and a trim securing part of the main clip body are directly connected. The trim securing part has a leg formed as a hollow tubular member. Flexible first latching pawls are formed in the leg and protrude radially outward from the leg. When the pin is inserted into the leg of the body securing part, then second latching pawls on the inside of the leg engage a latching shoulder on the pin, and pulling up on the pin is limited and inward movement of the first latching pawls is prevented, thus securing of the body securing part to a body panel is strengthened.

11 Claims, 7 Drawing Sheets

TRIM CLIP FOR TRIM FOR CURTAIN SIDE AIR BAG

CROSS-REFERENCE TO RELATED APPLICATIONS

This application claims the benefit of PCT Application No. PCT/US2008/076854, filed Sep. 18, 2008 and Japanese Application No. 2007-245389, filed Sep. 21, 2007, the disclosure of which is incorporated herein by reference.

BACKGROUND OF THE INVENTION

1. Technical Field

This invention relates to a trim clip suitable for holding curtain side air bag trim for covering and accommodating a curtain side air bag.

2. Background Technology

A trim clip suitable for holding curtain side air bag trim for covering and accommodating a curtain side air bag is described in PCT (WO) 2002-519551, gazette (Patent Literature 1). That trim clip is configured by a first male part that is snap-fastened inside an opening in a body panel, a second male part extending linearly from the first male part to the opposite side, a female part that is snap-fastened to the trim, into a hollow portion whereof the second male part is snap-fastened, and a flexible strap-shaped tether connecting the first male part and the female part. A curtain side air bag deploys very rapidly at the time of a vehicle collision, for example, to protect the head and other body parts of an occupant. The trim clip cited in Patent Literature 1 is such that, when the curtain side air bag deploys very rapidly and the trim separates away from a body panel with a strong force due to the force of that deployment, the second male part snap-fastened to the female part connected to the trim will separate from the female part, and the trim will separate away from the body panel to which the female part and the first male part have been secured, but, due to the tether extending from the female part connected to that trim, the flying out of the trim will be limited to a certain range, and the trim will be prevented from striking the head or other body part of the occupant.

Patent Literature 1: PCT (WO) 2002-519591, gazette (International Publication No. WO 99/67542)

Patent Literature 2: TOKKAI [Unexamined Patent Application Publication] No. 2001-026248, gazette Patent Literature 3: TOKKAI 2001-265134, gazette

DISCLOSURE OF INVENTION

Problems Invention Would Resolve

The trim clip cited in Patent Literature 1 is preferable because it has a tether by which the flying out of trim is limited to a certain range, whereupon the trim will be prevented from striking the head or other body part of an occupant. However, if the body securing part separates completely from the body panel, the tether will also, together therewith, separate completely from the body panel, whereupon the flying out of the trim will no longer be limited to the certain range. Accordingly, it is desirable that the body securing part be maintained so that it remains attached to the body panel, no matter how strong a force is applied. With the body securing part of the trim clip cited in Patent Literature 1, however, there is a danger of an anchor-shaped leg thereof being pulled out by a strong pulling-out force, and of the body securing part being pulled away from the tether due to damage or the like to the leg.

In Patent Literature 2 is described a pillar garnish structure for making air bag deployment smooth and preventing garnish (that is, trim) detachment. In the structure described in Patent Literature 2, in order to prevent detachment of the garnish, a pin, such as a rivet having a head with a slanted surface that enlarges the diameter of the outer diameter, is provided in a clip, whereby a pillar inner panel is prevented from detaching from the clip. This structure is not something that is applied to trim clips equipped with tethers, nor is it something for preventing the pulling away of a tether-equipped body securing part.

In Patent Literature 3 is described a structure, wherewith a member being secured to can easily be removed from an object being secured, for preventing the detachment of the member being secured to, even should a violent force be applied. This structure comprises a clip secured to a through-hole in the object being secured, and an insertion pin, one end whereof is inserted into a part to be inserted into in the clip, and the other end whereof is attached to the member being secured to, which has an enlarged head at that other end. The part to be inserted into of the clip comprises a step whereby, when the clip expands and opens due to the insertion of the pin head, movement of the pin head in a direction opposite that of insertion is prevented. Thereby, the structure prevents the member being secured to, which is attached to the pin, from being pulled away from the clip. This structure, likewise, is not something that is applied to trim clips equipped with tethers, nor is it something for preventing the pulling away of a tether-equipped body securing part.

Accordingly, an object of the present invention is to provide a tether-equipped trim clip wherewith a body securing part will not be pulled away from a body panel even should a strong pulling-out force act on the body securing part of the tether-equipped trim clip.

DISCLOSURE OF INVENTION

In order to attain that object, based on the present invention, a trim clip for curtain side air bags is provided which has a trim securing part and a body securing part connected by a strap-shaped tether of a certain length, which trim securing part is connected directly to the body securing part in the prior-to-use condition thereof, suitable for holding a body panel or the like, for a curtain side air bag, that covers and accommodates the curtain side air bag, to a member being attached to, wherein the body securing part has a leg that is inserted into and secured in an attachment hole in the member being attached to, the leg is formed in a hollow tubular shape, first latching pawls that protrude elastically outward in the radial direction are formed in the side surfaces of the leg, the first latching pawls exhibit the flexibility to bend, when the leg is inserted into the attachment hole of the member being attached to, from their protruding positions on the outside in the radial direction of the leg, to the hollow part of the leg on the inside in the radial direction thereof, and also having a pin that is inserted into the hollow part of the leg, which pin comprises a head connected detachably to the trim securing part, and a rod-shaped part that is inserted into the hollow part of the body securing part to prevent the first latching pawls from bending to the inside in the radial direction of the leg; wherein a space is formed in the rod-shaped part, allowing the first latching pawls to bend to the inside in the radial direction of the leg, wherein, further, when the trim securing part is directly connected to the body securing part, the pin is in a position whereat the space in the rod-shaped part will accept the first latching pawls, and whereat the first latching pawls are not prevented from bending to the inside in the radial direction of the leg, and, when the trim securing part moves so as to release the connection with the body securing part, the end portion, of the rod-shaped part of the pin that will have been moved by the movement of the trim securing part, where the space is not formed, will move to a position corresponding to the first latching pawls, inside the leg, preventing the first latching pawls from bending to the inside in the radial direction of the leg.

With the trim clip described above, when the trim securing part moves so as to be released from the connection with the body securing part, due to a violent and strong force when the curtain side air bag deploys, the end portion, wherein no space is formed, of the pin rod-shaped part that is moved by the movement of the trim securing part, moves to a position corresponding to the first latching pawls, inside the leg, preventing the first latching pawls from bending to the inside in the radial direction of the leg, whereupon the body securing part will not be pulled away from the body panel even should a strong pulling-out force act on the body securing part of the trim-equipped trim clip.

In the trim clip described above, the pin has a latching neck of small diameter formed between the head and the rod-shaped part, a pair of pin engaging pawls is formed in the trim securing part with which the latching neck engages, and the head is connected to the trim securing part. Connection means are provided in the body securing part and trim securing part for mutually connecting the two parts directly, the connection means in the body securing part are first locking pawls, acceptance space for accommodating the trim securing part connection means is formed between those first locking pawls, the trim securing part connections means are second locking pawls that are inserted into the acceptance space of the first locking pawls, and the second locking pawls are engaged with the first locking pawls by being inserted into the acceptance space.

In the trim securing part, the pair of pin engaging pawls is formed, on the inside of the second locking pawls, into the space between those pin engaging pawls, the latching neck of the pin is slid and accepted, and the head of the pin is connected detachably to the trim securing part. The trim securing part, when separating away from the body securing part due to a strong force such as that of curtain side air bag deployment, acts so as to pull the pin out from the body securing part, with the engagement between the second locking pawls and first locking pawls being released.

On the inside of the leg of the body securing part, in the space for the rod-shaped part of the pin, second latching pawls are formed, for latching to a latching shoulder formed on the tip end of the rod-shaped part, and, when the trim securing part acts so as to pull the pin out from the body securing part, separating away from the body securing part due to a strong force such as that of curtain side air bag deployment, the second latching pawls latch onto the latching shoulder, the pin is maintained in a condition of being connected to the body securing part, and the end portion of the rod-shaped part where the space is not formed moves to a position inside the leg corresponding to the first latching pawls to prevent the first latching pawls from bending to the inside in the radial direction of the leg.

The second latching pawls are formed on the inside of the first latching pawls and protrude to the inside of the leg, which second latching pawls, when the pin has been inserted into the leg, are accommodated in the space in the rod-shaped part, whereupon it is possible for the first latching pawls to bend, together with the second latching pawls, toward the inside in the radial direction, and, when the rod-shaped part of the pin is inserted into the hollow part of the leg, that rod-shaped part makes it possible for the second latching pawls to bend, together with the first latching pawls, to the inside in the radial direction. The second latching pawls latch onto the latching shoulder and the pin is maintained in the condition of being connected to the body securing part, and, when the trim securing part separates away from the body securing part due to a strong force such as that of curtain side air bag deployment, release is effected from the engagement between the pin engaging pawls and the latching neck of the pin, and the trim securing part separates away from the body securing part.

A projection is formed on the inner wall surface of the hollow part of the leg for maintaining the condition wherein the end portion of the pin rod-shaped part where the space is not formed is at a position corresponding to the first latching pawls. The pin comprises elastic pieces that protrude to the outside in the radial direction of the pin, between the head and the rod-shaped part, whereupon, when the pin has been inserted into the body securing part, the elastic pieces are deformed such that a return force resulting from the elasticity thereof is stored up, and, when a force acts to pull the pin upward, the return force acts to assist that pulling up of the pin.

The length of the tether, furthermore, is selected so that the trim supported by the trim securing part separating away from the body securing part will move greatly so as not to interfere with the deployment of the curtain side air bag, but also so that the distance of movement of that trim from the body securing part is limited so that the trim will not make contact with the head or other body part of an occupant.

BRIEF DESCRIPTION OF DRAWINGS

FIG. 11(A) is a section diagramming how trim is attached to a body panel using the trim clip diagrammed in FIG. 9, while 11(B) is a section at the E-E line of the trim clip diagrammed in Fig. (A).

FIG. 12(A) diagrams the trim clip in a condition wherein the trim tries to move, due to the very rapid deployment of a curtain side air bag, from the condition diagrammed in FIG. 11(A), while 12(B) is a section at the F-F line of the trim clip diagrammed in FIG. 12(A).

FIG. 13[(A)] is a section that, like that of FIG. 9, diagrams the trim clip in a condition of having moved, due to the very rapid deployment of a curtain side air bag, from the condition diagrammed in FIG. 12(A), while 13(B) is a section at the G-G line of the trim clip diagrammed in 13(A).

DETAILED DESCRIPTION OF THE INVENTION

Figure 1:
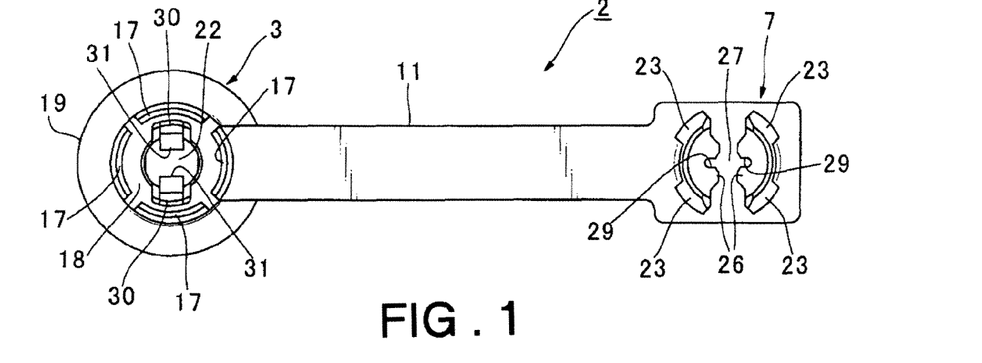
FIG. 1 is a plan of a main clip body of a tether-equipped trim clip relating to one embodiment of the present invention.
Figure 2:
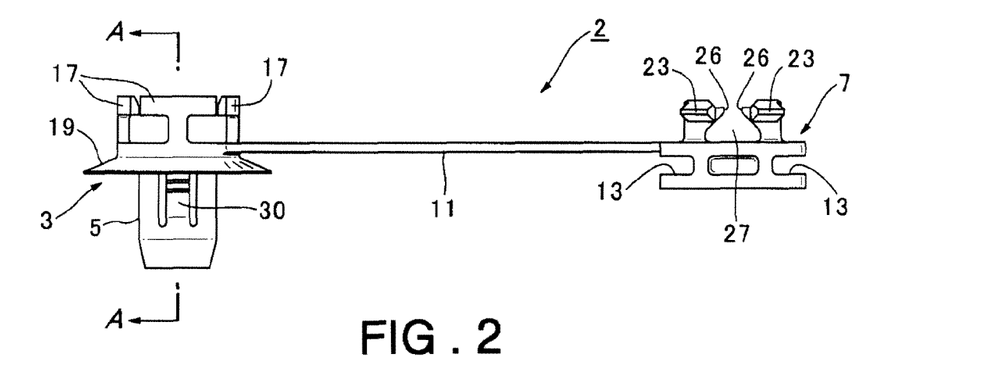
FIG. 2 is a front elevation of the main clip body diagrammed in FIG. 1.
Figure 3:
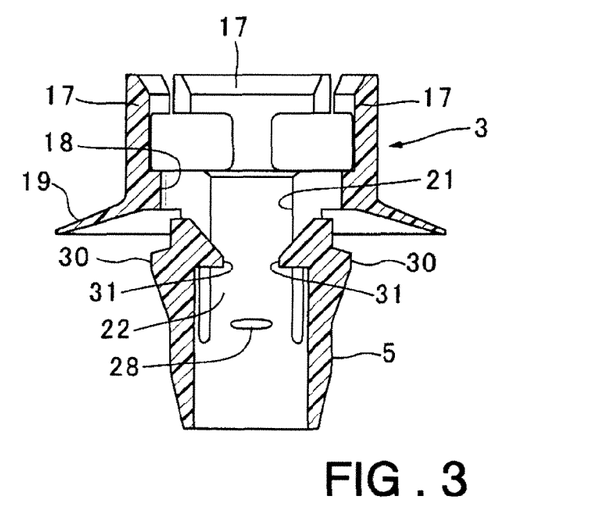
FIG. 3 is a section at the A-A line of the clip diagrammed in FIG. 2.
Figure 4:
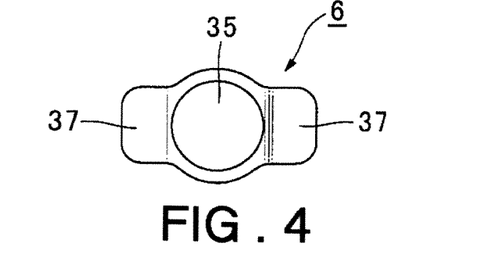
FIG. 4 is a plan of a pin in the trim clip relating to one embodiment of the present invention.
Figure 5:
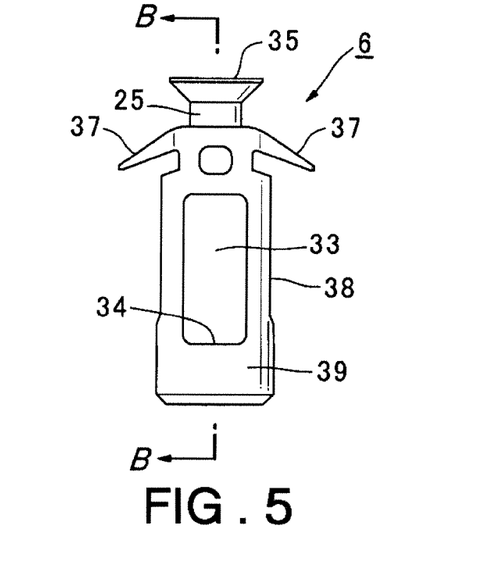
FIG. 5 is a front elevation of the pin diagrammed in FIG. 4.
Figure 6:
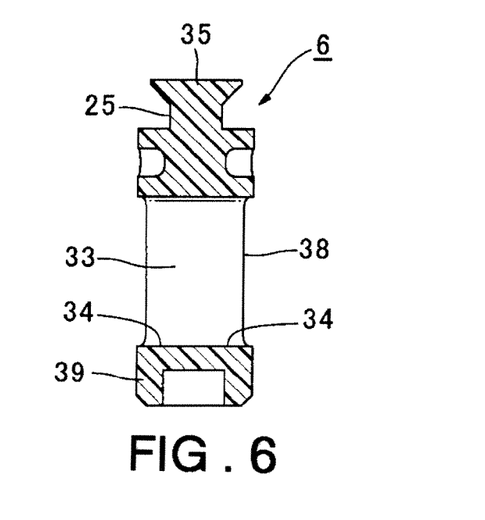
FIG. 6 is a section at the B-B line of the pin diagrammed in FIG. 5.
Figure 7:
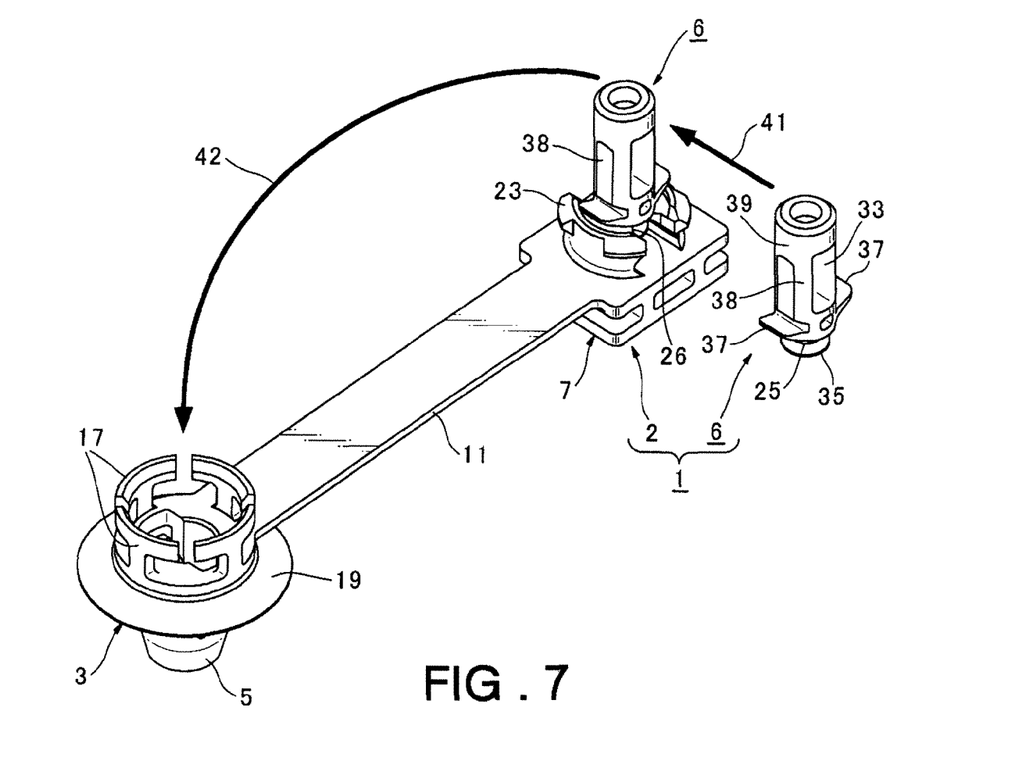
FIG. 7 is a diagonal view of a tether-equipped trim clip, relating to one embodiment of the present invention, in a condition prior to being assembled into the product condition.
Figure 8:
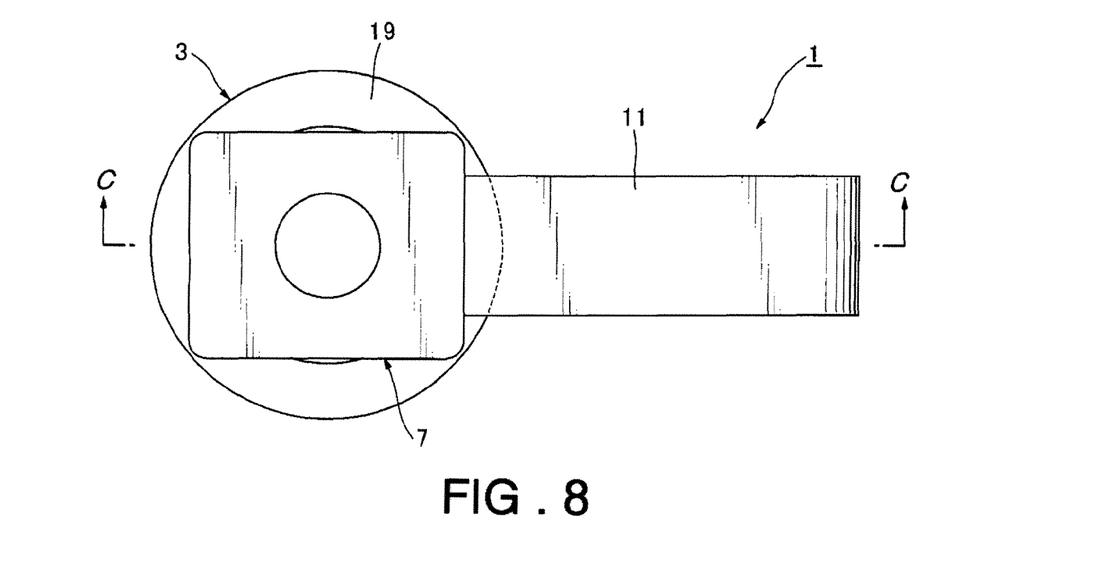
FIG. 8 is a plan of the trim clip diagrammed in FIG. 7, after being assembled into the product condition.
Figure 9:
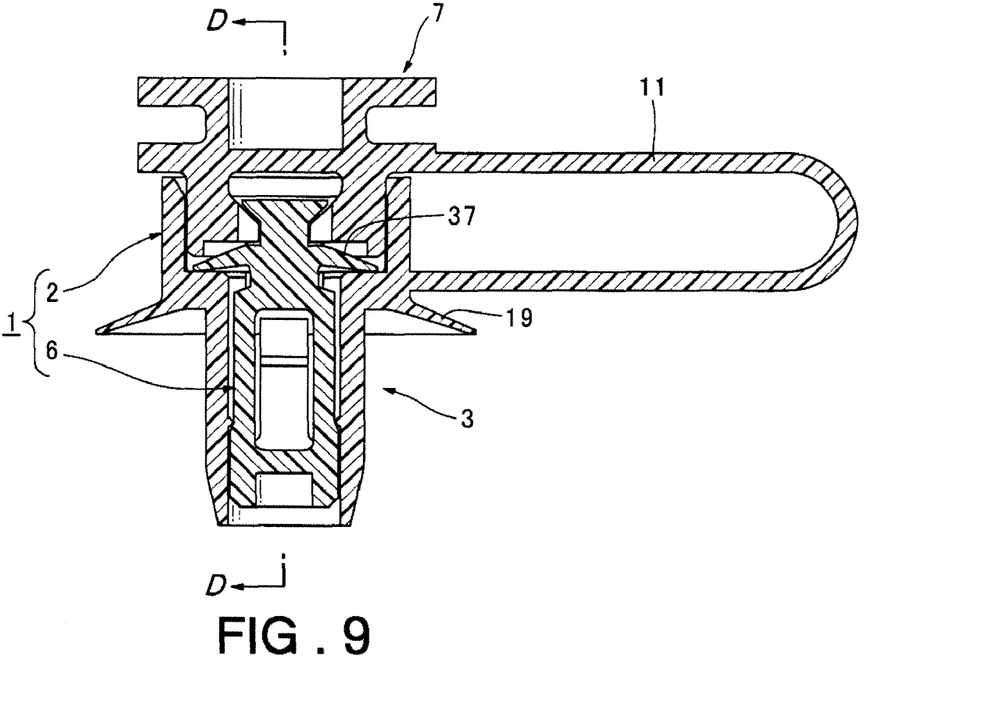
FIG. 9 is a section at the C-C line of the trim clip diagrammed in FIG. 8.
Figure 10:
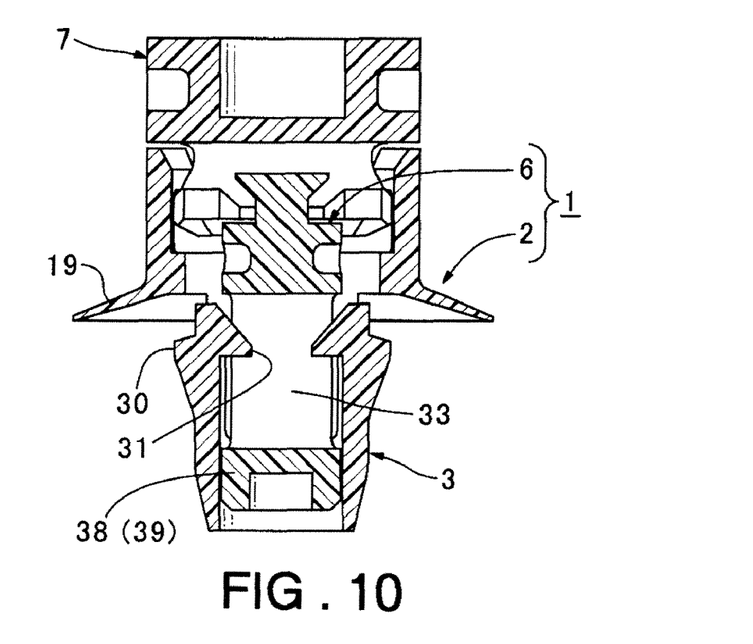
FIG. 10 is a section at the D-D line of the trim clip diagrammed in FIG. 9.
Figure 11:
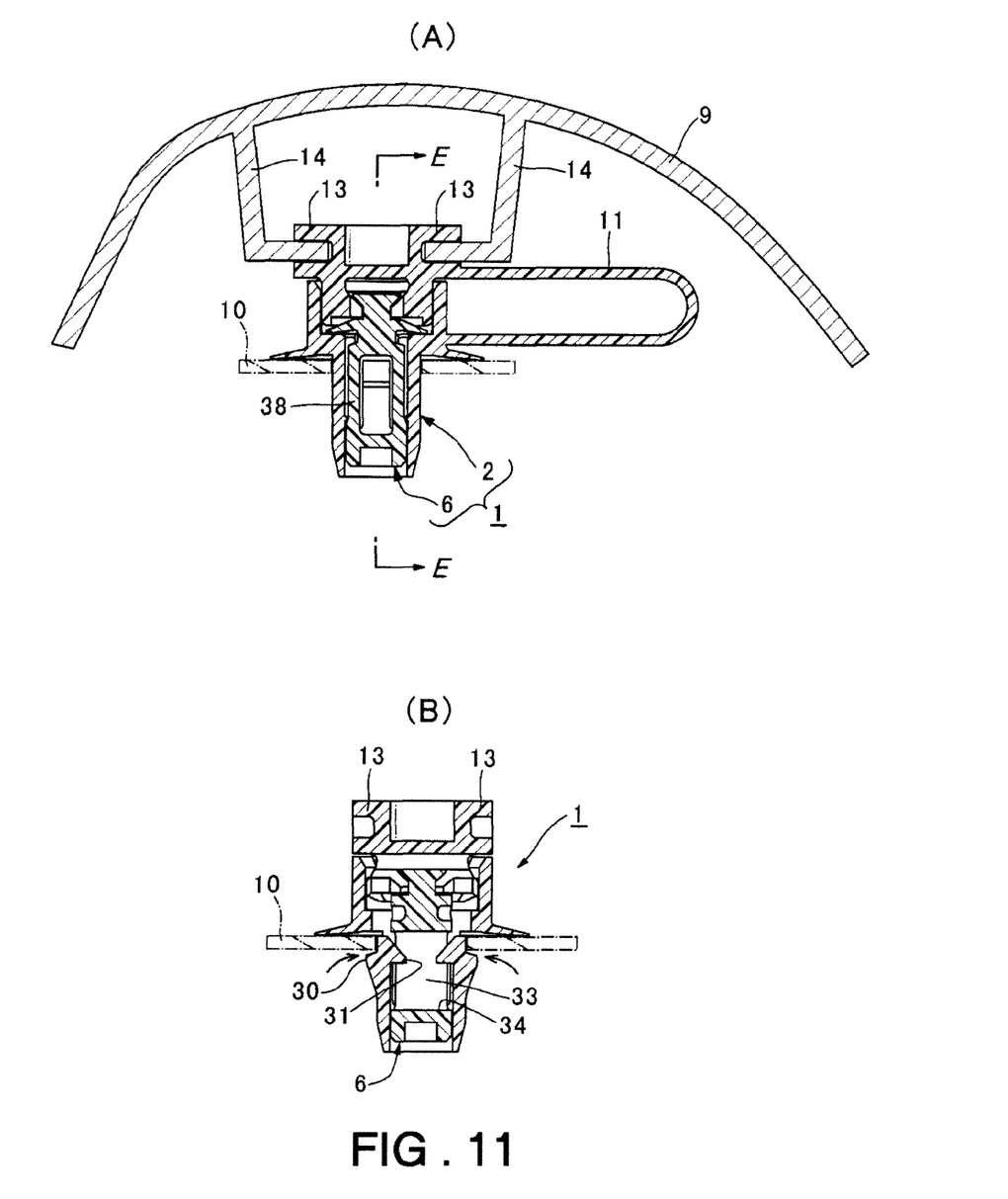
Figure 12:
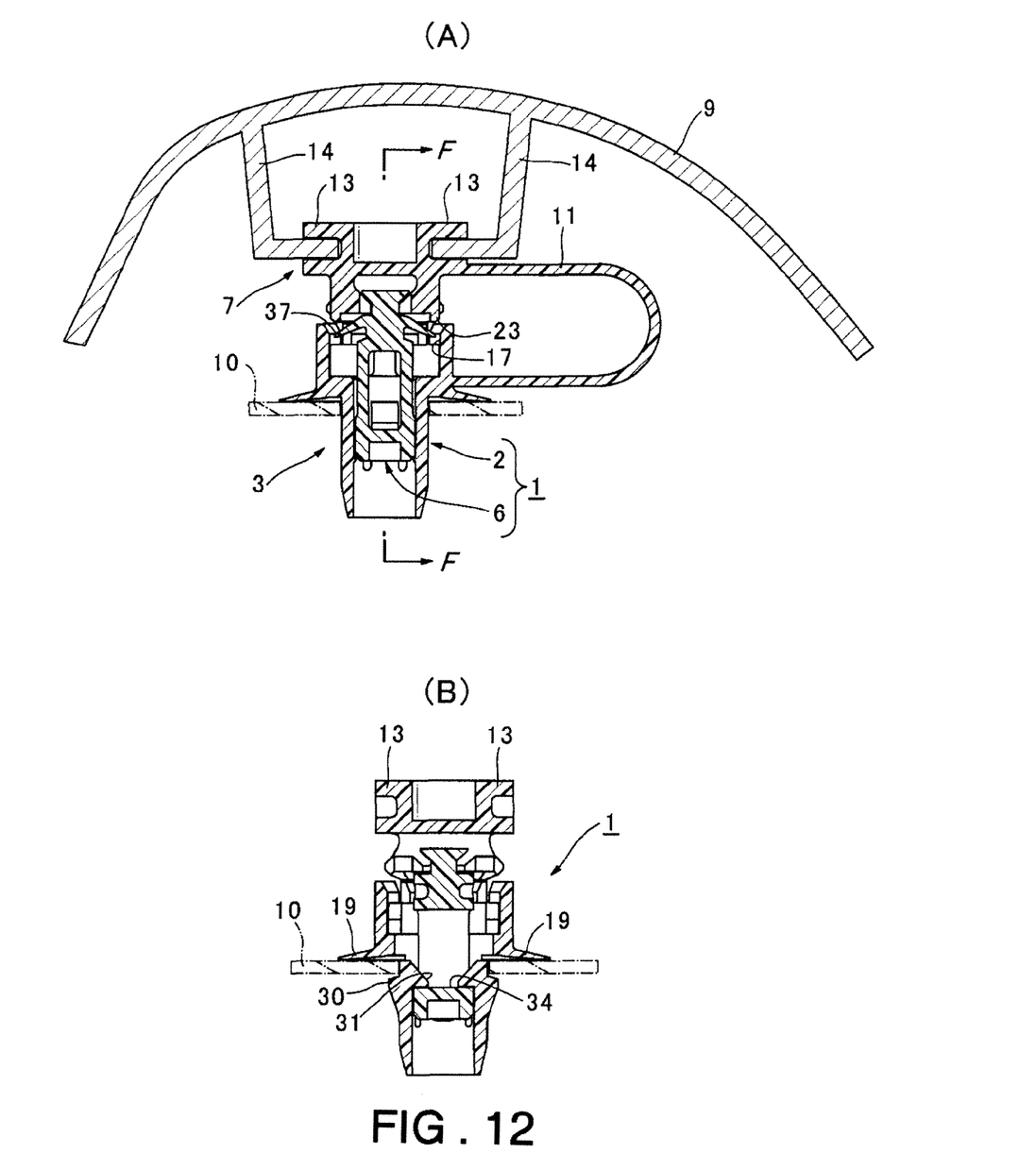

A tether-equipped trim clip 1, suitable for holding curtain side air bag trim, relating to a first embodiment of the present invention, is now described with reference to the drawings. FIGS. 1 to 3 diagram a main clip body 2, by itself, in its condition prior to a trim securing part 7 thereof being joined to a body securing part 3 thereof, which is the post-manufacture condition. FIGS. 4 to 6 diagram a pin 6, by itself, which is joined to the trim securing part 7 of the main clip body 2, being inserted into a leg 5 of the body securing part 3. FIG. 7 diagrams the operations of sliding the pin 6 into the trim securing part 7 of the main clip body 2 to join it therewith, and of connecting the trim securing part 7 to which the pin 6 has been joined, together with the pin 6, to the body securing part 3, to assemble the trim clip 1. FIGS. 8 to 10 diagram the assembled trim clip 1 in the prior-to-use product condition. The trim clip 1 comprises two components, namely the main clip body 2 and the pin 6, and the condition thereof diagrammed in FIGS. 8 to 10 constitutes the prior-to-use product. FIGS. 11(A) and 11(B) diagram how trim 9 is attached to a body panel 10 that is the member being attached to, using the trim clip 1. FIGS. 12(A) and 12(B), together with FIGS. 13(A) and 13(B), diagram how a curtain side air bag (not shown in the drawings) deploys to push the trim 9 up, and how the trim securing part 7 is detached from the body securing part 3.

In FIGS. 1 to 3, the main clip body 2 constitutes an integrally molded plastic product, wherein the trim securing part 7 and body securing part 3 are connected by a tether 11 of a certain length. The body securing part 3 has a leg 5 which is inserted into and attached in an attachment hole in the body panel 10 diagrammed in FIG. 11. The tether 11 is formed as a narrow strap that is flexible and tough, the length whereof is fixed. That length is selected so that, when the curtain side air bag deploys, the trim 9, supported by the trim securing part 7, which has separated from the body securing part 3, moves greatly so as not to interfere with the curtain side air bag deployment, but also so that the distance of movement from the body securing part 3 will be limited so that the trim 9 will not make contact with the head or other body part of an occupant. The trim securing part 7, in FIG. 2, has trim supports 13 in the lower part, which are attached to support frames 14 on the inside of the trim 9 diagrammed in FIG. 11. The trim supports 13 of the trim securing part 7, in the example diagrammed in the drawings, are formed in the shape of a pair of latching channels for accepting a pair of support frames 14 of the trim 9. The trim supports 13 may be of any shape or configuration so long as they may be attached to the trim 9.

In the body securing part 3 and trim securing part 7, connection means for connecting the two together are provided. At the top of the body securing part 3, four first locking pawls 17 are formed, each extending in a T shape, as diagrammed in the front elevation in FIG. 2, to form, overall, a substantially circular ring, as seen from above, as diagrammed in FIG. 1, which constitute the connection means of the body securing part 3. The first locking pawls 17 have flexibility, for bending outward in the radial direction, imparted thereto, making the insertion and engagement of the connection means of the trim securing part 7 certain. The inside of the first locking pawls 17 is formed in a hollow, such that the connection means of the trim securing part 7 are accommodated therein, into which the pin 6 is inserted and passed through. The root portions of the first locking pawls 17 are formed as a rigid circular base 18, at the outer circumferential edge whereof is formed a circular flange 19 that makes flush and stable contact with the body panel 10. In the center of the base 18, a hole 21 is formed, out from which the pin 6 extends, as diagrammed in FIGS. 1 and 3. The hole 21 connects to a hollow part 22 of the leg 5, and the pin 6 is inserted into the hole 21 and the hollow part 22.

The trim securing part 7, as diagrammed in FIG. 7, is folded back at an intermediate portion of the tether 11 so as to be directly connected to the body securing part 3. In the upper surface of the trim securing part 7, four second locking pawls 23 are formed, as seen in FIG. 2, which are enclosed by the four first locking pawls 17, are inserted into the space inside, and are latched with the first locking pawls 17, so that the body securing part 3 can be directly connected to. These second locking pawls 23 constitute the connection means of the trim securing part 7. As diagrammed in FIGS. 1 and 2, the second locking pawls 23 are formed to heights that will latch with the first locking pawls 17. In the second locking pawls 23, furthermore, on the inside, pin engagement pawls 26 are formed for accepting a latching neck 25 of the pin 6, and connecting the pin 6 to the trim securing part 7. The pin engagement pawls 26 are formed in a pair, as diagrammed in FIG. 1, so as to oppose each other and connect two of the second locking pawls 23, as seen from above. Between the two pin engagement pawls 26, as diagrammed in FIGS. 1 and 2, a space 27 is formed wherein the latching neck 25 of the pin 6 can be slid and accommodated. When the latching neck 25 of the pin 6 is accommodated in this space 27, the pin 6 is connected to the trim securing part 7 in an inverted attitude, as diagrammed in FIG. 7. Slots 29 are formed intermediately in the pin engagement pawls 26. These slots 29, in addition to establishing the position of the latching neck 25 of the pin 6, impart flexibility for the pin engagement pawls 26 to bend outward in the radial direction, and make it possible for the latching neck 25 of the pin 6 to separate from the pin engagement pawls 26 when forces act, during curtain side air bag deployment, to strongly pull the trim securing part 7 up and pull the pin 6 out.

Figure 13:
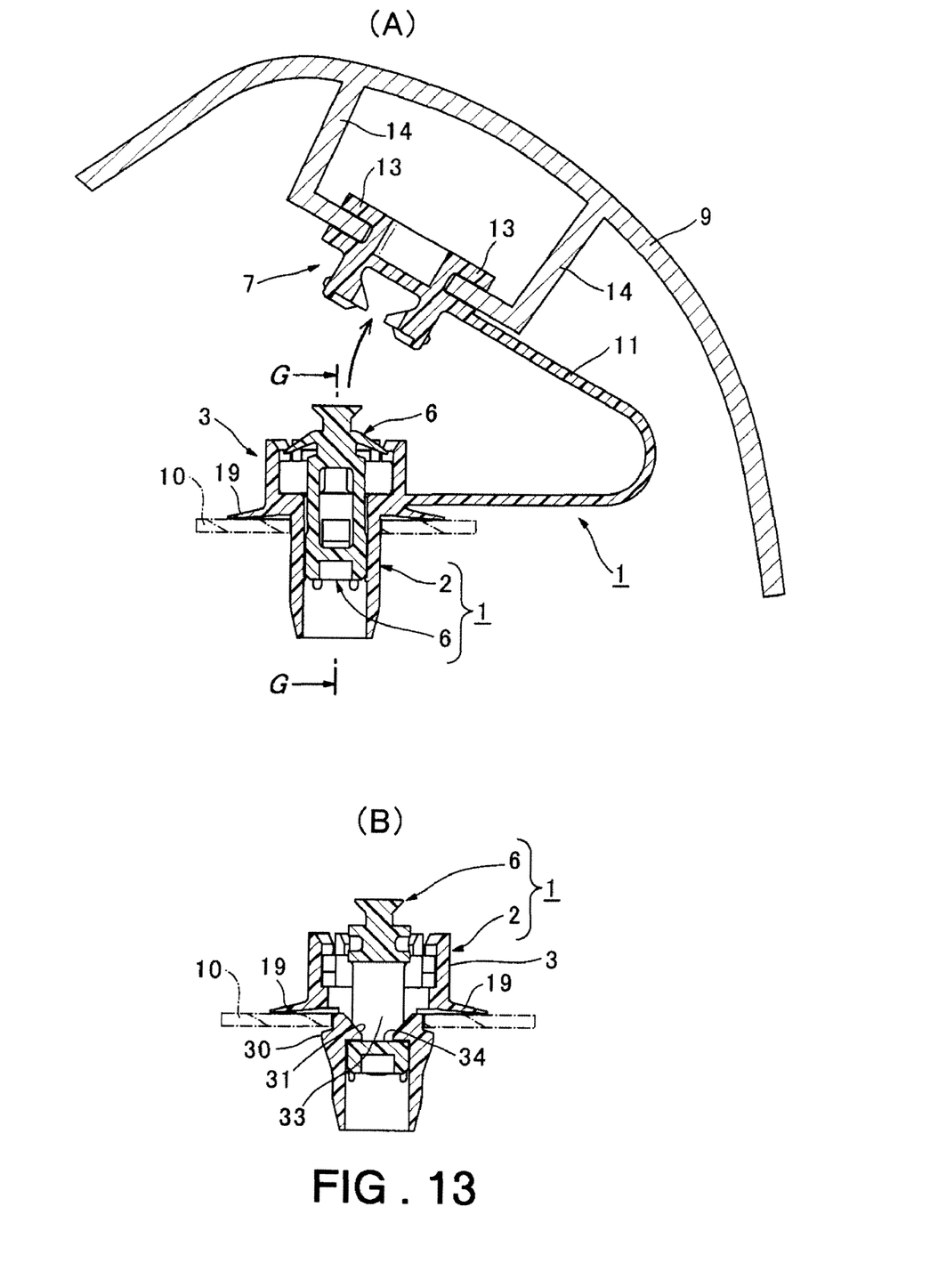

When the curtain side air bag deploys, the trim securing part 7 separates from the body securing part 3. The connections between the first locking pawls 17 and the second locking pawls 23 are such that, at the time of curtain side air bag deployment, the first locking pawls 17 bend outward and the engagement with the second locking pawls 23 is released, and the trim securing part 7, together with the trim 9, separates from the body securing part 3 (cf. FIG. 13). The range of trim securing part 7 separation is limited to the range of the length of the tether 11. When the trim securing part 7 separates from the body securing part 3, the pin 6 that is engaged with the pin engagement pawls 26 of the trim securing part 7 will also try to separate, together therewith, from the body securing part 3. However, as will be described subsequently, the pin 6 is configured so that, after it has moved to a prescribed height, it will not pull out from the body securing part 3. Due to this pin 6, the body securing part 3 also will not separate away from the body panel 10, wherefore the trim 9 secured to the trim securing part 7, the range of movement whereof is limited by the tether 11, will not harm an occupant. The pin engagement pawls 26 engaged in the latching neck 25 of the pin 6, moreover, bend outward due to the slots 29, the pin engagement pawls 26 separate from the pin 6, and the trim securing part 7 separates from the body securing part 3.

The leg 5 of the body securing part 3 is formed as a hollow tubular member so as to accept the pin 6. In the side surfaces of the tubular leg 5, there is a pair of first latching pawls 30 that face each other in the radial direction, protruding elastically outward in the radial direction, for working in conjunction with the flange 19 formed in the base 18 to secure the body securing part 3 to the body panel 10. The inside of the first latching pawls 30 is formed as the hollow part 22 through which the pin 6 passes. On the inside of the first latching pawls 30, second latching pawls 31 are formed for engaging a latching shoulder 34 formed by a space 33 formed in the center of the pin 6. When the space 33 in the rod-shaped part of the pin 6 is positioned inside the first latching pawls 30, the second latching pawls 31 are accepted in that space 33, whereupon the first latching pawls 30 and the second latching pawls 31 can bend to the inside in the radial direction. When the lower end 39 of the rod-shaped part 38 of the pin 6 is on the inside of the first latching pawls 30 due to the latching between the second latching pawls 31 and the latching shoulder 34 in the space 33 of the pin 6, the first latching pawls 30 are forced to positions wherein they protrude to the outside in the radial direction and cannot bend to the inside in the radial direction. This position of the pin 6 constitutes the locking position for the pin 6 of the body securing part 3. As a consequence, the body securing part 3 is firmly secured to the body panel 10, and, so long as neither the main clip body 2 nor the pin 6 fail, will not separate from the body panel 10. On the inside wall surfaces of the hollow part 22 in the leg 5, moreover, as diagrammed in FIG. 3, projections 28 are formed in a pair for maintaining the condition of the pin 6 wherein the second latching pawls 31 are latched on the latching shoulder 34. The projections 28 prevent the pin 6 from falling away from the leg 5 when released from the engagement of the pin latching pawls 26 of the trim securing part 7, wherefore the pin 6 will be maintained in the locked position described above, that is, in such condition that the lower end 39 of the rod-shaped part of the pin will be in a position corresponding to the first latching pawls 30 inside the leg 5.

Overall, the pin 6 is formed in a substantially rod-shaped, integrally molded plastic part. As diagrammed in FIGS. 4 to 6, the pin 6 comprises a head 35, the latching neck 25 of smaller diameter immediately below the head, a pair of elastic pieces 37 below the latching neck 25, and a rod-shaped part 38 that is inserted in the hollow part 22 in the leg 5 of the body securing part 3. The head 35 and latching neck 25 are used for effecting engagement with the pin engagement pawls 26 of the trim securing part 7 to attach the pin 6 to the trim securing part 7. The two elastic pieces 37 are not mandatory items, but will assist the pulling up of the pin 6, so that that can be done smoothly, when a pulling-up force acts on the pin 6. More specifically, when the pin 6 has been inserted into the body securing part 3 in the condition diagrammed in FIG. 9, it will be pushed against the base 18 of the body securing part 3, and, by the elasticity thereof, a return force will be stored up. When, as diagrammed in FIG. 13, the trim 9 tries to separate away from the body panel 10 and a pulling-up force from the trim securing part 7 acts on the pin 6, the return force of the elastic pieces 37 that have been deformed will act to assist the pulling up of the pin 6.

In the pin 6, the rod-shaped part 38 is formed to an outer diameter that is close to the inner diameter of the hollow part 22, but so as not to inhibit insertion into the hollow part 22 of the leg 5. The portion 39 at the lower end, below the space 33, is formed to a slightly larger diameter than the other portion. The space 33 extending in the longitudinal direction in the middle part of the rod-shaped part 38 accepts the second latching pawls 31 which protrude to the inside in the hollow part 22 of the leg 5, being formed to such width and length as will not inhibit the second latching pawls 31 and first latching pawls 30 from toppling to the inside of the hollow part 22. At the lower end of the space 33, moreover, the latching shoulder 34 is formed for engaging the second latching pawls 31. When a pulling-up force acts from the trim securing part 7 on the pin 6, the rod-shaped part 38 will be pulled upward inside the hollow part 22 of the leg 5, the space 33 which has accepted the second latching pawls 31 will also move upward, and the latching shoulder 34 at the lower end of the space 33 will latch with the second latching pawls 31. By this latching, the pulling up of the pin 6 is stopped, whereupon the pin 6 will not be pulled up any further. That is, the latching shoulder 34 and the second latching pawls 31 thereupon constitute pin 6 pull-up stoppers. Also, with the latching shoulder 34 short of the position where it will latch with the second latching pawls 31, the lower end 39 will ride over the projections 28 in the hollow part 22 of the leg 5. As a consequence, the pin 6 is prevented from falling away from the leg 5 when withdrawn from the engagement with the pin engagement pawls 26 of the trim securing part 7, and the pin 6 will be maintained in the locked position. In this locked position, the space 33 ceases to be positioned in the portion where the second latching pawls 31 are located, and the lower end 39 will push the second latching pawls 31 out to the outside in the radial direction, pushing the first latching pawls 30 (particularly the tips of the first latching pawls 30) out from the inside, wherefore the first latching pawls 30 will be forced to positions where they protrude to the outside in the radial direction, and cannot bend to the inside in the radial direction. In other words, the securing of the body securing part 3 to the body panel 10 is made firm by the first latching pawls 30 and the flange 19. As a consequence, the main clip body 2 is such that, so long as the pin 6 does not fail, the body securing part 3 will not separate from the body panel 10. The lower end 39, furthermore, should preferably be formed to a slightly larger diameter than the other rod-shaped part 38.

As diagrammed in FIG. 7, the pin 6 is slid, as indicated by the arrow 41, into the space 27 in the pin engagement pawls 26 on the inside of the second locking pawls 23 of the trim securing part 7 in the main clip body 2, and joined to the trim securing part 7 in an inverted attitude. Next, the trim securing part 7 to which the pin 6 has been joined is folded over midway along the tether 11, as indicated by the arrow 42, the rod-shaped part 38 of the pin 6 is inserted inside the first locking pawls 17 and into the hollow part of the leg 5, and the second locking pawls 23 are inserted inside the first locking pawls 17. Thereby, the trim securing part 7 is directly connected to the body securing part 3, with the pin 6 inserted into the leg 5 of the body securing part 3. When the rod-shaped part 38 of the pin 6 is inserted into the hollow part 22, moreover, it will come up against the second latching pawls 31, but, due to the flexibility thereof, will be pushed outward, together with the first latching pawls 30, in the radial direction, and the insertion thereof will not be hindered. After that insertion, the second latching pawls 31 are accommodated in the space 33 of the rod-shaped part 38 of the pin 6.

In FIGS. 8 to 10, the trim clip 1 is diagrammed, with the pin 6 inserted into the leg 5 of the body securing part 3, and the trim securing part 7 connected directly to the body securing part 3. This trim clip 1 thereupon assumes the prior-to-use product condition. As diagrammed in FIG. 10, the space 33 in the rod-shaped part 38 of the pin 6 will be in a position for accepting the second latching pawls 31, and the first latching pawls 30 will not be hindered from bending to the inside from positions of protruding to the outside in the radial direction. As a consequence, the insertion of the leg 5 of the body securing part 3 into the attachment hole in the body panel 10 will not be hindered. When the pin 6 has been inserted into the body securing part 3 in the condition diagrammed in FIG. 9, the elastic pieces 37 of the pin 6 will be pressed against the base 18 of the body securing part 3 and deformed, and the return force resulting from the elasticity thereof will be stored up.

FIG. 11(A) diagrams how the trim 9 is attached to the body panel 10 using the trim clip 1. FIG. 11(B) diagrams the connecting relationship between the main clip body 2 and the pin 6. In FIG. 11(A), the trim securing part 7 of the main clip body 2 is connected to the body securing part 3, the support frames 14 of the trim 9 are connected to the trim supports 13 of the trim securing part 7, and the leg 5 of the body securing part 3 is inserted into the attachment hole of the body panel 10, whereupon the body securing part 3 is connected to the body panel 10 by the first latching pawls 30 and the flange 19. As diagrammed in FIG. 11(B), the pin 6 will then be positioned so that the space 33 of the rod-shaped part 38 will accept the second latching pawls 31, the first latching pawls 30 will not be prevented from bending to the inside in the radial direction, and the insertion of the leg 5 of the body securing part 3 into the attachment hole of the body panel 10 will not be hindered. Although not shown in the drawings, a folded curtain side air bag is accommodated between the body panel 10 and the inside of the trim 9.

The action of the trim clip 1 when the curtain side air bag has very rapidly deployed is now described with reference to FIGS. 12(A) and 12(B), and FIGS. 13(A) and 13(B). The curtain side air bag deploys very rapidly in the event of a vehicle collision or the like so as to protect the head of an occupant. Due to that deployment, the trim 9 will be acted on by a force to separate it from the body panel 10, and the trim securing part 7, together with the trim 9, will try to separate away from the body securing part 3. Due to that force, the engagement between the first locking pawls 17 and the second locking pawls 23 will be released, and the trim securing part 7 will try to separate away from the body securing part 3 (FIG. 12(A)). The trim securing part 7, as diagrammed in FIG. 13(A), will separate from the body securing part 3, but the movement of the trim 9 will be limited by the certain length of the tether 11, whereupon that trim 9 will be prevented from making contact with the head or other body part of an occupant.

The movement of the pin 6 is now described with reference to FIG. 12(B) and FIG. 13(B). When the trim securing part 7 moves so as to separate away from the body securing part 3, the return force of the deformed elastic pieces 37 will act to assist the pulling-up of the pin 6. The pin 6 will move in the direction it is being pulled up in, and the second latching pawls 31 will engage the latching shoulder 34 in the space 33. Due to that engagement, the pulling up of the pin 6 will stop, whereupon the pin 6 cannot be pulled out any further. With the latching shoulder 34 short of the position where it latches with the second latching pawls 31, the lower end 39 of the rod-shaped part 38 will ride over the projections 28 in the hollow part 22 of the leg 5, the pin 6 released from the engagement with the pin latching pawls 26 of the trim securing part 7 will be prevented from falling away from the leg 5, and the pin 6 will be maintained in the locked position. In the locked position, the space 33 will cease to be positioned in the portion where the second latching pawls 31 are located, and the lower end 39 will push the second latching pawls 31 out to the outside in the radial direction, pushing the first latching pawls 30 out from the inside, wherefore, the first latching pawls 30 will be forced to positions where they protrude to the outside in the radial direction, and will not be able to bend to the inside in the radial direction. In other words, the body securing part 3 will be firmly secured to the body panel 10 by the first latching pawls 30 and the flange 19. As a consequence, so long as neither the main clip body 2 nor the pin 6 fail, the body securing part 3 will not separate away from the body panel 10. The body securing part 3 is secured firmly to the body panel 10 by the first latching pawls 30 which cannot bend to the inside in the radial direction. The forces moving the trim 9 and the trim securing part 7 due to the very rapid deployment of the curtain side air bag are transmitted to the body securing part 3 by the tether 11 so as to separate the body securing part 3 away from the body panel 10, but, because the pin 6 is in the active position, the body securing part 3 will not separate away from the body panel 10. As a consequence, the body securing part 3 will be maintained as is, attached to the body panel 10, irrespective of how strong a force is applied thereto. As a consequence, the trim 9 (and the trim securing part 7) will be definitely prevented from making contact with the head or other body part of an occupant.

What is claimed is:

1. A trim clip for a curtain side air bag trim, including a main clip body having a trim securing part and a body securing part connected by a strap-shaped tether of a certain length, said trim securing part being adapted to be connected directly to the body securing part, said trim clip being suitable for holding a curtain side air bag trim that covers and accommodates the curtain side air bag, to a body panel; the body securing part having a leg that is adapted to be inserted into and secured in an attachment hole in the member being attached to; the leg being of a hollow tubular shape; said leg having side surfaces provided with first latching pawls that protrude elastically outward in the radial direction; the first latching pawls exhibit the flexibility to bend, when the leg is inserted into the attachment hole of the member being attached to, from their protruding positions on the outside in the radial direction of the leg; to the hollow part of the leg on the inside in the radial direction thereof;

wherein said trim clip includes:

a pin that is formed separately from said main clip body and adapted to be inserted into the hollow part of said leg; said pin comprising a head adapted to be connected detachably to the trim securing part, and a rod-shaped part that is adapted to be inserted into the hollow part of said body securing part and has a diametrical dimension sufficient to prevent said first latching pawls from bending toward the inside in the radial direction of the leg; a space being formed in said rod-shaped part, allowing said first latching pawls to bend to the inside in the radial direction of the leg;

said space formed in said rod-shaped part being located such that, when the trim securing part is directly connected to the body securing part with said head of said pin attached to said trim securing part, said pin is in a first position whereat said space in said rod-shaped part is able to accommodate said first latching pawls, so that said first latching pawls are not prevented from bending to the inside in the radial direction of the leg; and when the trim securing part is moved in the direction wherein the connection of the trim securing part with the body securing part is separated, said pin is moved together with the movement of the trim securing part in the direction of being retracted from said hollow part of the leg of the body securing part for a predetermined distance, to a second position where the end portion of said rod-shaped part of the pin that has no said space formed therein is opposed to said first latching pawls, preventing the first latching pawls from bending to the inside in the radial direction of the leg;

a stopping mechanism being provided between said body securing part and said pin for preventing said pin from being withdrawn beyond said second position from said hollow part of said leg of the body securing part when said trim securing part is subjected to a force which is sufficient to separate the connection between the trim securing part and the body securing part.

2. The trim clip according to claim 1, wherein said pin has a latching neck of small diameter formed between said head and said rod-shaped part; a pair of pin engaging pawls is formed in the trim securing part with which said latching neck engages; and said head is connected to the trim securing part.

3. The trim clip according to claim 2, wherein connection means are provided in the body securing part and trim securing part for mutually connecting the two parts directly; the connection means in the body securing part are first locking pawls; acceptance space for accommodating the trim securing part connection means is formed between those first locking pawls; the trim securing part connections means are second locking pawls that are inserted into the acceptance space of the first locking pawls; and the second locking pawls are engaged with the first locking pawls by being inserted into said acceptance space.

4. The trim clip according to claim 3, wherein in the trim securing part, said pair of pin engaging pawls is formed on the inside of said second locking pawls; into the space between those pin engaging pawls, the latching neck of said pin is slid and accepted; and the head of the pin is connected detachably to the trim securing part.

5. The trim clip according to claim 4, wherein the trim securing part, when separating away from the body securing part due to a strong force such as that of curtain side air bag deployment, acts so as to pull said pin out from the body securing part, with the engagement between the second locking pawls and first locking pawls being released.

6. The trim clip according to claim 5, wherein on the inside of said leg of said body securing part, in the space for the rod-shaped part of said pin, second latching pawls are formed, for latching to a latching shoulder formed on the tip end of the rod-shaped part; and, when the trim securing part acts so as to pull said pin out from the body securing part, separating away from the body securing part due to a strong force such as that of curtain side air bag deployment, said second latching pawls latch onto said latching shoulder, the pin is maintained in said second position so as to be hold in a condition of being connected to said body securing part, and the end portion of said rod-shaped part where said space is not formed moves to a position inside the leg corresponding to said first latching pawls to prevent said first latching pawls from bending to the inside in the radial direction of the leg.

7. The trim clip according to claim 6, wherein said second latching pawls are formed on the inside of said first latching pawls and protrude to the inside of said leg; said second latching pawls, when said pin has been inserted into said leg, are accommodated in the space in said rod-shaped part, whereupon it is possible for said first latching pawls to bend, together with the second latching pawls, toward the inside in the radial direction; and, when the rod-shaped part of said pin is inserted into the hollow part of said leg, that rod-shaped part makes it possible for said second latching pawls to bend, together with said first latching pawls, to the inside in the radial direction.

8. The trim clip according to claim 5, wherein said second latching pawls latch onto said latching shoulder and said pin is maintained in the condition of being connected to said body securing part; and, when said trim securing part separates away from the body securing part due to a strong force such as that of curtain side air bag deployment, release is effected from the engagement between said pin engaging pawls and the latching neck of said pin, and said trim securing part separates away from said body securing part.

9. The trim clip according to claim 6, wherein a projection is formed on the inner wall surface of the hollow part of said leg at a position where the projection is brought into engagement with said pin when the pin is moved to said second potion for maintaining the condition wherein the end portion of the pin rod-shaped part where said space is not formed is at a position corresponding to said first latching pawls.

10. The trim clip according to claim 7, wherein said pin comprises elastic pieces that protrude to the outside in the radial direction of the pin, between said head and said rod-shaped par; when said pin has been inserted into the body securing part, the elastic pieces are deformed such that a return force resulting from the elasticity thereof is stored up; and, when a force acts to pull the pin upward, said return force acts to assist that pulling up of the pin.

11. The trim clip according to claim 8, wherein the length of said tether is selected so that the trim supported by the trim securing part separating away from the body securing part will move greatly so as not to interfere with the deployment of the curtain side air bag, but also so that the distance of movement of that trim from the body securing part is limited so that the trim will not make contact with the head or other body part of an occupant.

* * * * *